(12) United States Patent
Song (10) Patent No.: US 10,789,308 B2
(45) Date of Patent: Sep. 29, 2020

(54) METHOD AND APPARATUS FOR SEARCHING APPLICATION AND MOBILE TERMINAL

(71) Applicant: BEIJING KINGSOFT INTERNET SECURITY SOFTWARE CO., LTD., Beijing (CN)

(72) Inventor: Yumeng Song, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 367 days.

(21) Appl. No.: 15/752,292

(22) PCT Filed: Aug. 15, 2016

(86) PCT No.: PCT/CN2016/095325
§ 371 (c)(1),
(2) Date: Feb. 13, 2018

(87) PCT Pub. No.: WO2017/028769
PCT Pub. Date: Feb. 23, 2017

(65) Prior Publication Data
US 2018/0218077 A1    Aug. 2, 2018

(30) Foreign Application Priority Data
Aug. 19, 2015  (CN) .......................... 2015 1 0512291

(51) Int. Cl.
*G06F 17/30*    (2006.01)
*G06F 16/951*    (2019.01)
(Continued)

(52) U.S. Cl.
CPC ........ *G06F 16/951* (2019.01); *G06F 3/04817* (2013.01); *G06F 9/453* (2018.02); *G06F 16/00* (2019.01); *G06F 16/953* (2019.01)

(58) Field of Classification Search
CPC ...... G06F 16/951; G06F 16/953; G06F 16/00; G06F 9/453; G06F 3/04817
See application file for complete search history.

(56) References Cited

U.S. PATENT DOCUMENTS

| 10,547,607 | B2 * | 1/2020 | Hinohara | ................ H04M 3/56 |
| 2014/0040231 | A1 * | 2/2014 | Lin | ....................... G06F 16/951 |
| | | | | 707/708 |
| 2014/0279997 | A1 * | 9/2014 | Chiussi | ................ G06F 16/335 |
| | | | | 707/706 |

FOREIGN PATENT DOCUMENTS

| CN | 101178712 | | 5/2008 |
| CN | 103177104 A | * | 6/2013 |

(Continued)

OTHER PUBLICATIONS

ISA/CN, International Search Report for International Application No. PCT/CN2016/095325, dated Nov. 18, 2016.

*Primary Examiner* — Huawen A Peng
(74) *Attorney, Agent, or Firm* — Hodgson Russ LLP (57) ABSTRACT

A method and an apparatus for searching an application are provided. The method includes: receiving a search keyword of the application inputted in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification (Continued)

information of the one or more second applications. A mobile terminal is further provided.

17 Claims, 3 Drawing Sheets

(51) Int. Cl.
 *G06F 16/953* (2019.01)
 *G06F 16/00* (2019.01)
 *G06F 9/451* (2018.01)
 *G06F 3/0481* (2013.01)

(56) References Cited

FOREIGN PATENT DOCUMENTS

| | | |
|---|---|---|
| CN | 104598620 | 5/2015 |
| CN | 105138629 | 12/2015 |

* cited by examiner

METHOD AND APPARATUS FOR SEARCHING APPLICATION AND MOBILE TERMINAL

CROSS REFERENCE TO RELATED APPLICATION

This application is a U.S. national phase application of International Application No. PCT/CN2016/095325, filed on Aug. 15, 2016, which claims priority to and benefits of Chinese Patent Application No. 201510512291.7, filed with State Intellectual Property Office on Aug. 19, 2015, which is entitled as "Application program search method and device", the entire content of which is incorporated herein by reference.

FIELD

The present disclosure relates to application search technology field, and more particularly to a method and an apparatus for searching an application, and a mobile terminal.

BACKGROUND

With the development of technology, there are more and more applications installed on a mobile terminal of a user, and a requirement of the user for the applications has increased accordingly.

Usually, the user needs to find a desired application. A search box provided by the mobile terminal may be used by the user to input a keyword so as to search the application installed locally on the mobile terminal. The application searched by the user may be a local-installed application, or an application not installed locally. If the application searched by the user is not installed on the mobile terminal, the user may not find the corresponding application by searching via the search box. In this case, the user needs to search via a webpage.

Since the user may not know whether the application is installed locally on the mobile terminal, the user may need to input the keyword in the search box to search, and to input the keyword in the webpage to search if there is no search result, which leads to tedious operations.

SUMMARY

An objective of embodiments of the present disclosure is to provide a method and an apparatus for searching an application.

In order to solve the above objective, embodiments of the present disclosure discloses a method for searching an application. The method is applied in a mobile terminal and includes: receiving a search keyword of the application inputted in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the keyword; and determining whether identification information of one or more second applications matching with the search keyword and fed back by the search engine of the application market is received within a preset time period, and if yes, displaying the identification information of the one or more second applications.

An apparatus for searching an application is provided, which is applied in a mobile terminal, and includes: a keyword receiving unit, a local search unit, a first identification displaying unit, a first keyword sending unit, a receiving judging unit and a second identification displaying unit, in which the keyword receiving unit is configured to receive a search keyword of the application inputted in a search box; the local search unit is configured to search locally in the mobile terminal for the application matching with the search keyword, and to trigger the first identification displaying unit if one or more first applications are found, otherwise, to trigger the first keyword sending unit; the first identification displaying unit is configured to display identification information of the one or more first applications; the first keyword sending unit is configured to send the search keyword to a search engine of an application market, so as to search in the application market for the application matching with the search keyword; the receiving judging unit is configured to determine whether identification information of one or more second applications matching with the search keyword and fed back by the search engine of the application market is received within a preset time period, and to trigger the second identification displaying unit if yes; and the second identification displaying unit is configured to display the identification information of the one or more second applications.

Embodiments of the present disclosure also provide a storage medium, configured to store an application program, the application program is configured to execute a method for searching an application according to an embodiment of the present disclosure at running time. The method is applied in a mobile terminal and includes: receiving a search keyword of the application inputted in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

Embodiments of the present disclosure also provide an application program, the application program is configured to execute the method for searching an application according to an embodiment of the present disclosure at running time. The method for searching an application according to the present disclosure may be applied in a mobile terminal. The method includes: receiving a search keyword of the application inputted in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

Embodiments of the present disclosure also provide a mobile terminal, including a processor, a memory, a communication interface and a bus, in which the processor, the memory and the communication interface are connected via the bus and communicate with each other; the memory is configured to store executable program codes; the processor is configured to execute a program corresponding to the executable program codes by reading the executable program codes stored in the memory, so as to execute following steps: receiving a search keyword of the application inputted in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 1:
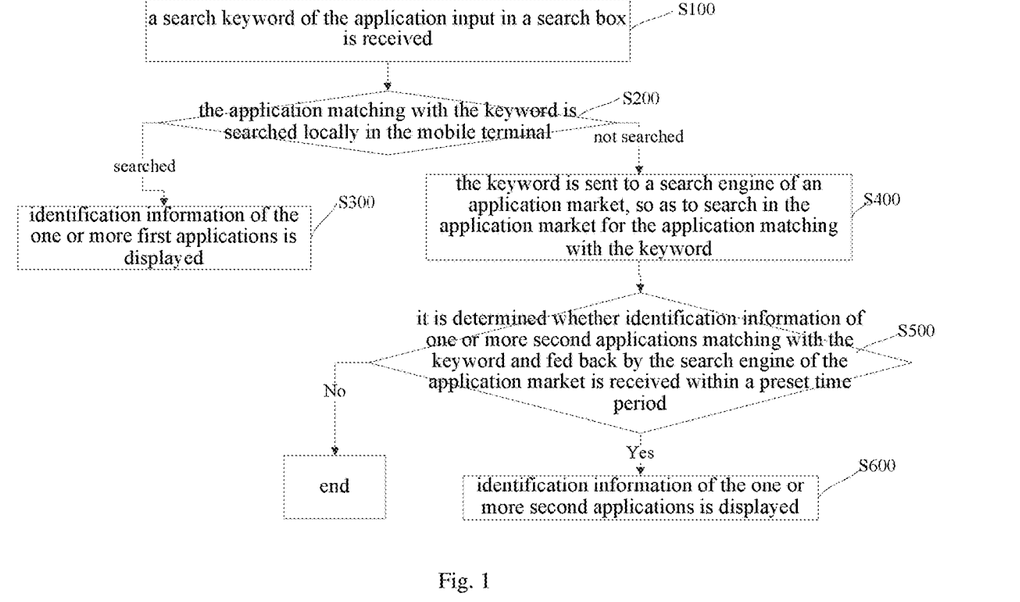
FIG. 1 is a flow chart of a method for searching an application provided by an embodiment of the present disclosure.

As shown in FIG. 1, the method for searching an application may be applied in a mobile terminal and include following acts.

At block S100, a search keyword of the application input in a search box is received.

The search keyword of the application may be a Bopomofo, a Chinese character, an English word, an English word in a shorten form, or the like input manually. The search keyword of the application may also be a Bopomofo, a Chinese character, an English word, an English word in a shorten form, or the like acquired by recognizing an input speech.

At block S200, the application matching with the keyword is searched locally in the mobile terminal, and it is judged whether one or more first applications matching with the keyword are found; if yes, an act at block S300 is executed, otherwise, an act at block S400 is executed.

Specifically, the application matching with the keyword is searched locally in the mobile terminal by comparing names of installation packages of applications installed locally on the mobile terminal with the input search keyword of the application. Of course, other ways may be used, which is not limited in the present disclosure.

At block S300, identification information of the one or more first applications is displayed.

The identification information of the application may include: at least one of an icon of the application, a name of the application and a version number of the application.

Specifically, the act at block S300 may further include followings.

The identification information of the one or more first applications is displayed in a preset order, in which, the preset order is: an order of the identification information of the one or more first applications determined according to one or more names of the one or more first applications, or, an order of the identification information of the one or more first applications determined according to using information of the one or more first applications from the user.

Specifically, if the name of the application is written in English, the identification information of the one or more first applications may be ordered according to initials of the names of the one or more first application. For example, the identification information of the one or more first applications may be ordered conforming to the alphabetical order from A to Z. If the name of the application is written in Chinese, the identification information of the one or more first applications may be ordered according to initials of Bopomofo of the names of the one or more first applications. Further, when the initials are same, the identification information of the first applications whose initials are same may be ordered according to the second letters of the names Specifically, sequencing the identification information of the one or more first applications according to using information of the one or more first applications from the user may be realized in two ways: in the first way, the order of the identification information of the one or more first applications may be determined according to the using information of the one or more first applications from a local user; in the second way, the order of the identification information of the one or more first applications may be determined according to the using information of the one or more first applications from a plurality of users. The using information may be a using time period, a using frequency, etc.

The first way, in which the order of the identification information of the one or more first applications may be determined according to the using information of the one or more first applications from a local user, may lead to a relatively targeted ordering of the identification information, thereby conforming to an interest and using habit of the local user. The second way, in which the order of the identification information of the one or more first applications may be determined according to the using information of the one or more first applications from a plurality of users, may make the identification information ordering more universal, such that the applications attracting public interests can be recommended to the local user.

In other embodiments of the present disclosure, the method may also include: receiving a first click operation on the identification information of one of the one or more first applications searched in the mobile terminal locally, and launching an application corresponding to the identification information clicked by the first click operation according to the first click operation.

At block S400, the keyword is sent to a search engine of an application market, so as to search in the application market for the application matching with the keyword.

The search engine of the application market may be the search engine of the application market provided by a supplier of an operating system of the mobile terminal, or, may be the search engine of the application market provided by a manufacturer of the mobile terminal, which is not limited herein. Specifically, when searching by the search engine of the application market, the searching may be only performed among a certain number of applications, for example, applications on a top trending list.

The applications on a top trending list may be acquired by data mining technology, and a detail page including detail information of the application and a download link of the application may be generated.

At block S500, it is determined whether identification information of one or more second applications matching with the keyword and fed back by the search engine of the application market is received within a preset time period, and if yes, an act at block S600 is executed, otherwise, the process ends.

At block S600, the identification information of the one or more second applications is displayed.

Figure 2:
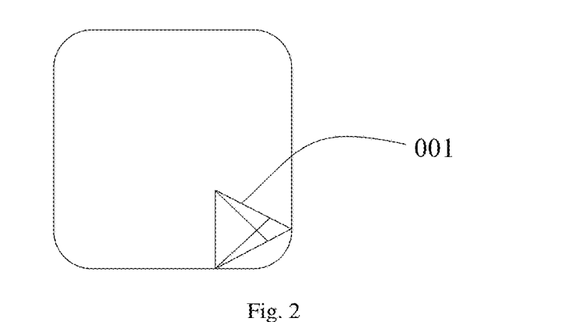
FIG. 2 is a schematic diagram of a source identification of an application provided by an embodiment of the present disclosure.

The identification information of the application may be an icon of the application, and the icon of the application may include a source identification of the application. For example, the source identification of the application indicating that the application is from the application market may be the identification 001 as shown in FIG. 2. Of course, the source identification of the application searched locally in the mobile terminal may include or not include the source identification of the application. The source identification included in the identification information of the application searched in the application market may be different from that included in the identification information of the application searched locally in the mobile terminal.

Specifically, the act at block S600 may include: displaying the identification information of the one or more second applications in a preset order, in which, the preset order is: an order of the identification information of the one or more second applications determined according to one or more names of the one or more second applications, or, an order of the identification information of the one or more second applications determined according to using information of the one or more second applications from the user.

In other embodiments of the present disclosure, the method may also include: receiving a second click operation on the identification information of one of the one or more second applications searched by the search engine of the application market, and opening an interface of the application market displaying an application corresponding to the identification information clicked by the second click operation according to the second click operation.

The opened interface of the application market may be the detail page of the application, in which the detail page may include detail information of the application and a download link of the application. The user may view the detail information of the application in the detail page and download the application via the download link provided by the detail page.

Embodiments of the present disclosure also provide another method for searching an application. The method may also include: if no identification information of an application matching with the keyword and fed back by the search engine of the application market is received within the preset time period, sending the keyword to other search engines to search.

Other search engines may include search engines such as Baidu, Google and the like. Sending the keyword to other search engines may be realized using a prior art, which will not be described herein.

With the method for searching an application according to embodiments of the present disclosure, after a search keyword of the application input in a search box is received, the application matching with the keyword may be searched locally in the mobile terminal, and if no application is found, the keyword may be sent to a search engine of an application market, so as to search in the application market for the application matching with the keyword. Using the technical solution of the present disclosure, the user only needs to input the search keyword of the application in the search box, thereby simplifying the search process, saving time for users and improving user experience.

Corresponding to the method embodiments, the present disclosure also provides an apparatus for searching an application.

Figure 3:
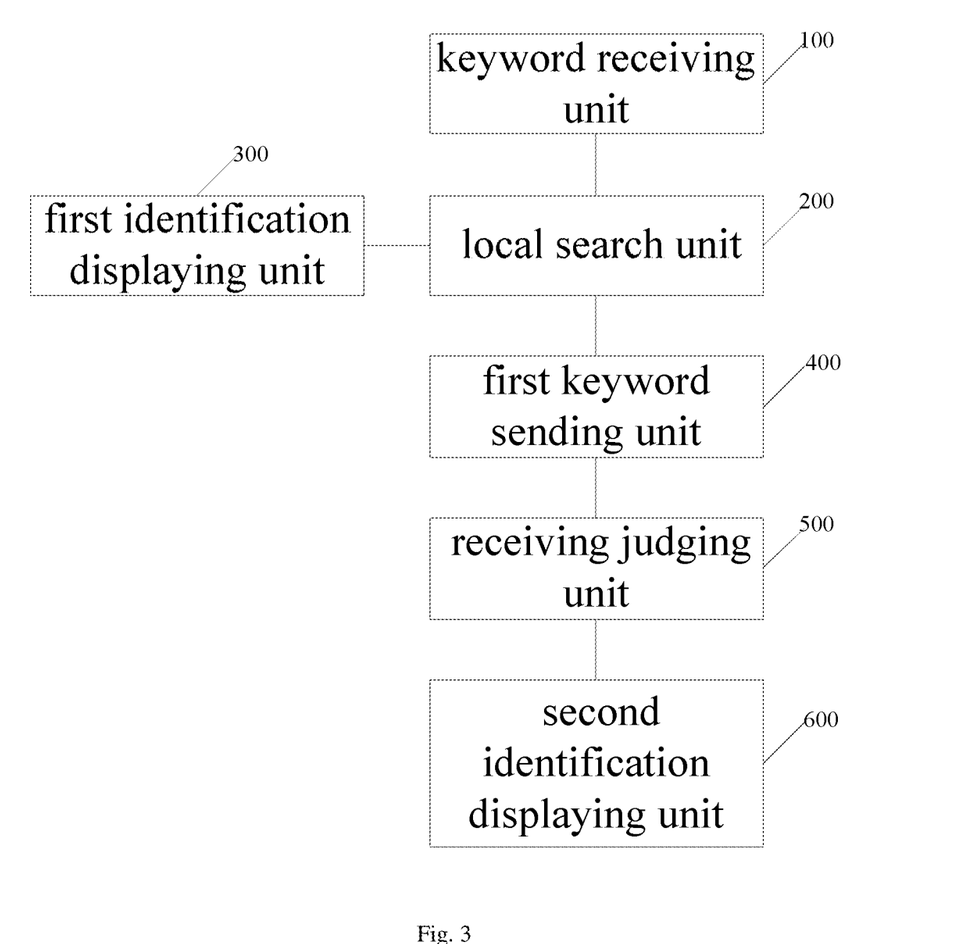
FIG. 3 is a block diagram of an apparatus for searching an application provided by an embodiment of the present disclosure.

As shown in FIG. 3, an apparatus for searching an application according to an embodiment of the present disclosure is provided. The apparatus is applied in a mobile terminal, and the apparatus may include: a keyword receiving unit 100, a local search unit 200, a first identification displaying unit 300, a first keyword sending unit 400, a receiving judging unit 500 and a second identification displaying unit 600.

The keyword receiving unit 100 is configured to receive a search keyword of the application inputted in a search box.

The search keyword of the application may be a Bopomofo, a Chinese character, an English word, an English word in a shorten form, or the like input manually. The search keyword of the application may also be a Bopomofo, a Chinese character, an English word, an English word in a shorten form, or the like acquired by recognizing an input speech.

The local search unit 200 is configured to search locally in the mobile terminal for the application matching with the search keyword, and to trigger the first identification displaying unit 300 if one or more first applications are found, otherwise, to trigger the first keyword sending unit 400.

Specifically, the application matching with the keyword is searched locally in the mobile terminal by comparing names of installation packages of applications installed locally on the mobile terminal with the input search keyword of the application.

The first identification displaying unit 300 is configured to display identification information of the one or more first applications.

The identification information of the application may include: at least one of an icon of the application, a name of the application and a version number of the application.

Specifically, the first identification displaying unit 300 is further configured to display the identification information of the one or more first applications in a preset order, in which, the preset order is: an order of the identification information of the one or more first applications determined according to one or more names of the one or more first applications, or, an order of the identification information of the one or more first applications determined according to using information of the one or more first applications from the user.

Specifically, sequencing the identification information of the one or more first applications according to using information of the one or more first applications from the user may be realized in two ways: in the first way, the order of the identification information of the one or more from applications may be determined according to the using information of the one or more from applications from a local user; in the second way, the order of the identification information of the one or more first applications may be determined according to the using information of the one or more from applications from a plurality of users. The using information may be a using time period, a using frequency, etc.

The first way, in which the order of the identification information of the one or more first applications may be determined according to the using information of the one or more from applications from a local user, may lead to a relatively targeted ordering of the identification information, thereby conforming to an interest and using habit of the local user.

The second way, in which the order of the identification information of the one or more first applications may be determined according to the using information of the one or more from applications from a plurality of users, may make the identification information ordering more universal, such that the applications attracting public interests can be recommended to the local user.

The first keyword sending unit 400 is configured to send the search keyword to a search engine of an application market, so as to search in the application market for the application matching with the keyword.

The search engine of the application market may be the search engine of the application market provided by a supplier of an operating system of the mobile terminal, or, may be the search engine of the application market provided by a manufacturer of the mobile terminal, which is not limited herein. Specifically, when searching by the search engine of the application market, the searching may be only performed among a certain number of applications, for example, applications on a top trending list.

The receiving judging unit 500 is configured to determine whether identification information of one or more second applications matching with the search keyword and fed back by the search engine of the application market is received within a preset time period, and to trigger the second identification displaying unit 600 if yes.

The second identification displaying unit 600 is configured to display the identification information of the one or more second applications.

The identification information of the application may be an icon of the application, and the icon of the application may have a source identification of the application.

Specifically, the second identification displaying unit 600 is further configured to display the identification information of the one or more second applications in a preset order, in which, the preset order is: an order of the identification information of the one or more second applications determined according to one or more names of the one or more second applications, or, an order of the identification information of the one or more second applications determined according to using information of the one or more second applications from the user.

In other embodiments of the present disclosure, the apparatus shown in FIG. 3 may also include an application launching unit.

The application launching unit is configured to receive a first click operation on the identification information of one of the one or more first applications searched in the mobile terminal locally, and to launch an application corresponding to the identification information clicked by the first click operation according to the first click operation.

In other embodiments of the present disclosure, the apparatus shown in FIG. 3 may also include an application market interface opening unit.

The application market interface opening unit is configured to receive a second click operation on the identification information of one of the one or more second applications searched by the search engine of the application market, and to open an interface of the application market displaying an application corresponding to the identification information clicked by the second click operation according to the second click operation.

The opened interface of the application market may be the detail page of the application, in which the detail page may include detail information of the application and a download link of the application. The user may view the detail information of the application in the detail page and download the application via the download link provided by the detail page.

Another apparatus for searching an application provided by embodiments of the present disclosure may also include a second keyword sending unit, configured to send the search keyword to other search engines to search if a judging result acquired by the receiving judging unit 500 indicates that no identification information of an application matching with the search keyword and fed back by the search engine of the application market is received within the preset time period.

Other search engines may include search engines such as Baidu, Google and the like. Sending the keyword to other search engines may be realized using a prior art, which will not be described herein.

With the apparatus for searching an application according to embodiments of the present disclosure, after a search keyword of the application input in a search box is received, the application matching with the keyword may be searched locally in the mobile terminal, and if no application is found, the keyword may be sent to a search engine of an application market, so as to search the application matching with the keyword in the application market. Using the technical solution of the present disclosure, the user only needs to input the search keyword of the application in the search box, thereby simplifying the search process, saving time for users and improving user experience.

Accordingly, embodiments of the present disclosure also provide a storage medium, configured to store an application program, the application program is configured to execute a method for searching an application at running time. The method is applied in a mobile terminal, and the method includes: receiving a search keyword of the application input in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

By applying the embodiments of the present disclosure, after a search keyword of the application input in a search box is received, the application matching with the keyword may be searched locally in the mobile terminal, and if no application is found, the keyword may be sent to a search engine of an application market, so as to search the application matching with the keyword in the application market. Using the technical solution of the present disclosure, the user only needs to input the search keyword of the application in the search box, thereby simplifying the search process, saving time for users and improving user experience.

Accordingly, embodiments of the present disclosure also provide an application program, the application program is configured to execute a method for searching an application at running time. The method is applied in a mobile terminal, and the method includes: receiving a search keyword of the application input in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

By applying the embodiments of the present disclosure, after a search keyword of the application input in a search box is received, the application matching with the keyword may be searched locally in the mobile terminal, and if no application is found, the keyword may be sent to a search engine of an application market, so as to search the application matching with the keyword in the application market. Using the technical solution of the present disclosure, the user only needs to input the search keyword of the application in the search box, thereby simplifying the search process, saving time for users and improving user experience.

Figure 4:
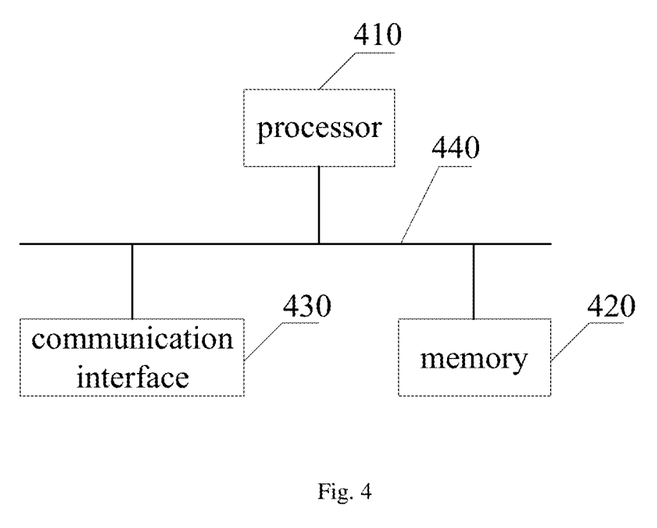
FIG. 4 is a structure diagram of a mobile terminal provided by an embodiment of the present disclosure.

Accordingly, embodiments of the present disclosure also provide a mobile terminal. As shown in FIG. 4, the mobile terminal includes: a processor 410, a memory 420, a communication interface 430 and a bus 440.

The processor 410, the memory 420 and the communication interface 430 are connected via the bus 440 and communicate with each other.

The memory 420 is configured to store executable program codes.

The processor 410 is configured to execute a program corresponding to the executable program codes by reading the executable program codes stored in the memory, so as to execute following steps: receiving a search keyword of the application input in a search box; searching locally in the mobile terminal for the application matching with the search keyword, and if one or more first applications are found, displaying identification information of the one or more first applications, otherwise, sending the search keyword to a search engine of an application market, so as to search in the application market for the application matching with the search keyword; and determining whether identification information of one or more second applications matching with the search keyword and fed back by the search engine of the application market is received within a preset time period, and if yes, displaying the identification information of the one or more second applications.

By applying the embodiments of the present disclosure, after a search keyword of the application input in a search box is received, the application matching with the keyword may be searched locally in the mobile terminal, and if no application is found, the keyword may be sent to a search engine of an application market, so as to search the application matching with the keyword in the application market. Using the technical solution of the present disclosure, the user only needs to input the search keyword of the application in the search box, thereby simplifying the search process, saving time for users and improving user experience.

In should be noted that, in this description, relation terms such as first and second and the like is merely used to distinguish an object or operation from another object or operation, and it is not necessary to require or imply that there is any real relations or order among these objects or operations. Furthermore, terms "comprise", "include" or any other modifications are aim at covering non-exclusive "include", such that a process, a method, a term or a device including a series of elements also includes other elements which are not listed definitely. Without further limitation, an element defined by a sentence "include a . . . " may not exclusive of other same elements included in the process, the method, the term or the device including the said element.

Each embodiment in the specification is described in the progressive manner and illustrates in emphasis what is different from the other embodiments, and the same or similar parts in the embodiments are just references to each other. With respect to the system embodiment of the present disclosure, since the system corresponds to the method embodiment, the description is relatively simple, and for the relevant part, reference is made to the part of description of the method embodiment.

The present disclosure has been described with reference to the preferred embodiments, which should not be understood as limitation of the scope of the present disclosure. Various changes and modifications of the present disclosure may be made without departing from the spirit and scope of the present disclosure should be included in the scope of the present disclosure.

What is claimed is:

1. A method for searching an application, applied in a mobile terminal, and comprising:
  receiving a search keyword of the application inputted in a search box;
  searching locally in the mobile terminal for the application matching with the search keyword, and if one or more first applications are found, displaying identification information of the one or more first applications, if one or more first applications are not found, sending the search keyword to a search engine of an application market, so as to search in the application market for the application matching with the search keyword; and
  determining whether identification information of one or more second applications matching with the search keyword and fed back by the search engine of the application market is received within a preset time period, and if identification information of one or more second applications matching with the search keyword and fed back by the search engine of the application market is received within a preset time period, displaying the identification information of the one or more second applications;

wherein the identification information of the application is an icon of the application, wherein the icon of the application has a source identification of the application, the source identification of the application indicating that the application is from the application market or searched locally in the mobile terminal;

when the icons of the first application and the second application both have the source identification of the application, the source identification of the second application is different from the source identification of the first application, or when the icon of the first application does not have the source identification of the application, the icon of the second application has the source identification of the application.

2. The method according to claim 1, wherein, displaying the identification information of the one or more first applications comprises:

displaying the identification information of the one or more first applications in a preset order, in which, the preset order is: an order of the identification information of the one or more first applications determined according to one or more names of the one or more first applications, or, an order of the identification information of the one or more first applications determined according to using information of the one or more first applications from the user.

3. The method according to claim 2, wherein, the using information comprises at least one of a using time period and a using frequency.

4. The method according to claim 2, further comprising: if no identification information of an application matching with the search keyword and fed back by the search engine of the application market is received within the preset time period, sending the search keyword to other search engines to search.

5. The method according to claim 1, wherein, displaying the identification information of the one or more second applications comprises:

displaying the identification information of the one or more second applications in a preset order, in which, the preset order is one of: an order of the identification information of the one or more second applications determined according to one or more names of the one or more second applications, and, an order of the identification information of the one or more second applications determined according to using information of the one or more second applications from the user.

6. The method according to claim 5, further comprising: if no identification information of an application matching with the search keyword and fed back by the search engine of the application market is received within the preset time period, sending the search keyword to other search engines to search.

7. The method according to claim 1, further comprising: receiving a first click operation on the identification information of one of the one or more first applications searched in the mobile terminal locally, and launching an application corresponding to the identification information clicked by the first click operation according to the first click operation.

8. The method according to claim 1, further comprising: receiving a second click operation on the identification information of one of the one or more second applications searched by the search engine of the application market, and opening an interface of the application market displaying an application corresponding to the identification information clicked by the second click operation according to the second click operation.

9. The method according to claim 1, further comprising: if no identification information of an application matching with the search keyword and fed back by the search engine of the application market is received within the preset time period, sending the search keyword to other search engines to search.

10. The method according to claim 1, wherein, the identification information of the application comprises at least one of an icon of the application, a name of the application and a version number of the application.

11. An apparatus for searching an application, applied in a mobile terminal, and comprising:

a processor;

a memory storing instructions executable by the processor;

wherein the processor is configured to:

receive a search keyword of the application inputted in a search box;

search locally in the mobile terminal for the application matching with the search keyword, and if one or more first applications are found, display identification information of the one or more first applications; if one or more first applications are not found, send the search keyword to a search engine of an application market, so as to search in the application market for the application matching with the search keyword; and determine whether identification information of one or more second applications matching with the search keyword and fed back by the search engine of the application market is received within a preset time period, if identification information of one or more second applications matching with the search keyword and fed back by the search engine of the application market is received within a preset time period, display the identification information of the one or more second applications;

wherein the identification information of the application is an icon of the application, wherein the icon of the application has a source identification of the application, the source identification of the application indicating that the application is from the application market or searched locally in the mobile terminal;

when the icons of the first application and the second application both have the source identification of the application, the source identification of the second application is different from the source identification of the first application, or when the icon of the first application does not have the source identification of the application, the icon of the second application has the source identification of the application.

12. The apparatus according to claim 11, wherein, the processor is further configured to:

display the identification information of the one or more first applications in a preset order, in which, the preset order is: an order of the identification information of the one or more first applications determined according to one or more names of the one or more first applications, or, an order of the identification information of the one or more first applications determined according to using information of the one or more first applications from the user.

13. The apparatus according to claim 11, wherein the processor is further configured to display the identification information of the one or more second applications in a preset order, in which, the preset order is one of: an order of the identification information of the one or more second applications determined according to one or more names of the one or more second applications, and, an order of the identification information of the one or more second applications determined according to using information of the one or more second applications from the user.

14. The apparatus according to claim 11, wherein the processor is further configured to receive a first click operation on the identification information of one of the one or more first applications searched in the mobile terminal locally, and to launch an application corresponding to the identification information clicked by the first click operation according to the first click operation.

15. The apparatus according to claim 11, wherein the processor is further configured to receive a second click operation on the identification information of one of the one or more second applications searched by the search engine of the application market, and to open an interface of the application market displaying an application corresponding to the identification information clicked by the second click operation according to the second click operation.

16. The apparatus according to claim 11, wherein the processor is further configured to send the search keyword to other search engines to search if no identification information of an application matching with the search keyword and fed back by the search engine of the application market is received within the preset time period.

17. A mobile terminal, comprising a processor, a memory, a communication interface and a bus, wherein, the processor, the memory and the communication interface are connected via the bus and communicate with each other; the memory is configured to store executable program codes; the processor is configured to execute a program corresponding to the executable program codes by reading the executable program codes stored in the memory, so as to execute following steps:

receiving a search keyword of the application inputted in a search box;

searching locally in the mobile terminal for the application matching with the search keyword, and if one or more first applications are found, displaying identification information of the one or more first applications, if one or more first applications are not found, sending the search keyword to a search engine of an application market, so as to search in the application market for the application matching with the search keyword; and determining whether identification information of one or more second applications matching with the search keyword and fed back by the search engine of the application market is received within a preset time period, and if identification information of one or more second applications matching with the search keyword and fed back by the search engine of the application market is received within a preset time period, displaying the identification information of the one or more second applications;

wherein the identification information of the application is an icon of the application, wherein the icon of the application has a source identification of the application, the source identification of the application indicating that the application is from the application market or searched locally in the mobile terminal;

when the icons of the first application and the second application both have the source identification of the application, the source identification of the second application is different from the source identification of the first application, or when the icon of the first application does not have the source identification of the application, the icon of the second application has the source identification of the application.

* * * * *